United States Patent [19]

Knobel et al.

[11] Patent Number: 5,122,558

[45] Date of Patent: Jun. 16, 1992

[54] STATIC DISSIPATIVE INTERPOLYMERS

[75] Inventors: Thomas M. Knobel, Lake Jackson, Tex.; Tu-Anh Pham, Philadelphia, Pa.; Donald M. Maschmeyer, Lake Jackson; Lance L. Black, Richwood, both of Tex.

[73] Assignee: The Dow Chemical Company, Midland, Mich.

[21] Appl. No.: 617,307

[22] Filed: Nov. 19, 1990

Related U.S. Application Data

[63] Continuation of Ser. No. 272,179, Nov. 16, 1988, abandoned, which is a continuation-in-part of Ser. No. 149,986, Jan. 29, 1988, abandoned, and a continuation of Ser. No. 174,062, Mar. 28, 1988, abandoned, which is a continuation-in-part of Ser. No. 149,986, Jan. 29, 1988, abandoned, which is a continuation of Ser. No. 939,699, Dec. 9, 1986, abandoned.

[51] Int. Cl.$^5$ ............................. C08K 5/42; C08J 9/00
[52] U.S. Cl. .................................... 524/165; 524/183; 524/184; 521/85; 521/89
[58] Field of Search ...................... 524/165, 183, 184; 521/85, 89

[56] References Cited

U.S. PATENT DOCUMENTS

| | | | |
|---|---|---|---|
| 3,589,906 | 6/1971 | McDowell | 524/912 |
| 4,313,978 | 2/1982 | Stevens | 524/912 |
| 4,617,325 | 10/1986 | Knobel | 524/912 |

*Primary Examiner*—Joseph L. Schofer
*Assistant Examiner*—Peter Mulcahy

[57] ABSTRACT

This invention is a polymer containing a plurality of ketone groups in the polymer backbone and containing an amount of a non-volatile, ionizable metal salt sufficient to render it static dissipative. The polymer is substantially devoid of a fatty acid salt, a $C_6$–$C_{30}$ carboxylic acid ester and a phosphate ester compound. The static dissipative polymer can be used neat or blended with other polymers for use in applications requiring static dissipative behavior.

39 Claims, No Drawings

一5,122,558

STATIC DISSIPATIVE INTERPOLYMERS

CROSS REFERENCE TO THE RELATED APPLICATION

This is a continuation of application Ser. No. 272,179, filed Nov. 16, 1988, now abandoned. Which is a continuation-in-part of both application Ser. No. 149,986 filed Jan. 29, 1988, now abandoned, which is a continuation of application Ser. No. 939,669, filed Dec. 9, 1986 (now abandoned): and of Application Ser. No. 174,062, filed Mar. 28, 1988 which is a continuation-in-part of said application Ser. No. 149,986, all of which applications are incorporated by reference herein in their entireties.

Background of the Invention

This invention relates to static dissipative polymers containing carbonyl groups in the polymer backbone.

With the recent proliferation of electronic equipment there has developed a rapidly growing market for static dissipative packaging materials. Many electronic devices, including printed circuits and microchips, are extremely vulnerable to damage from static discharges of as little as 50 volts. Since static discharges of up to 10,000 volts are commonly encountered during the normal handling of these devices, it is necessary to protect them from static discharges during their manufacture, transportation and use.

In transporting electronic devices, it is desirable to enclose the device in a packaging material which is lightweight, strong, easily fabricated into a configuration which is adapted to the size and shape of the electronic device, and which will protect the device from harmful static discharges. Plastics, and polyolefins in particular, possess all of the foregoing characteristics except the ability to provide static protection. Accordingly, much effort has gone into developing a suitable means for rendering polyolefins sufficiently static dissipative to use in packaging electronic devices.

One method is to laminate the polyolefin to a metal layer, or to employ one or more metal layers in a laminate structure. This method provides excellent static dissipative behavior, but is relatively expensive and not adaptable to a wide variety of uses. In particular, metalized polyolefins are very useful for packaging small components, but are often too difficult to fabricate to be useful packaging materials for larger devices, such as assembled electronic equipment. Moreover, having a metal in contact with sensitive electronics is undesirable since the metal is too conductive, and can conduct electrical charges to the electronic device rather than away from it. Also, a bimetallic effect is often seen between the metals in the electronic device and the metalized plastic.

Another approach is to render a polyolefin static dissipative by using a conductive additive. Various materials have been used for this purpose, including fillers such as carbon black, graphite and metallic fibers. Although these materials impart static dissipative behavior to the polymer, they also radically change its physical characteristics, rendering it unsuitable for fabrication into many applications. These fillers have the potential drawback of introducing contamination to the electronic device. In addition, the metallic fibers have the same limitations as metalized plastics.

Yet another approach is to incorporate an amine, humectant or surfactant compound into the polymer. These materials operate by exuding to the surface of the polymer, where they absorb atmospheric moisture to form an electrolyte microlayer. This microlayer is sufficiently conductive to render the polymer static dissipative. Four major problems are encountered with this approach. Since the static dissipative agents are on the surface, they are subject to being rubbed off during handling. In this manner, the static dissipative effect is reduced or destroyed until more of the amine, humectant or surfactant can migrate to the surface. Further, since the static dissipative agent is being continually removed, the polymer will eventually lose its static dissipative properties. In addition, these static dissipative agents depend on a humid environment for effective operation. Thus, their static dissipative behavior will vary according to the local relative humidity, and will be minimal in arid environments. Finally, these static dissipative agents are sometimes corrosive or are potential contaminants.

Accordingly, it would be desirable to provide a static dissipative polymer which has excellent static dissipative properties which are not significantly dependent on local humidity, are stable over time, and which has physical properties which permit it to be used for a variety of packaging and other static control applications.

SUMMARY OF THE INVENTION

In one aspect, this invention is a polymer having a plurality of ketone groups in the polymer backbone, or blend of such polymers, which polymer contains dissolved or dispersed therein an amount of a non-volatile, ionizable metal salt sufficient to render the polymer static dissipative, which polymer is substantially devoid of a fatty acid salt, a $C_6$-$C_{30}$ carboxylic acid ester or a phosphate ester compound.

In another aspect, this invention is a static dissipative polymer blend comprising a physical admixture of (a) a first polymer which is not a ketone-containing polymer, (b) a polymer having a plurality of ketone groups in the polymer backbone (referred to herein as a "carbonyl-containing polymer"), and (c) a non-volatile, ionizable metal salt wherein said non-volatile, ionizable metal salt is present in an amount sufficient to render the blend static dissipative, which blend is substantially devoid of a fatty acid salt, a $C_6$-$C_{30}$ carboxylic acid ester and a phosphate ester compound.

In other aspects, the invention is the process of preparing such static dissipative carbonyl-containing polymers and the process of preparing static dissipative polymer blends.

The static dissipative ketone-containing polymer, and polymer blends containing same, have excellent static dissipative properties at surprisingly low levels of the non-volatile, ionizable metal salt. Because the salt is used at such low levels, it has little adverse effect on the physical properties of the polymer, or blends prepared therewith. Accordingly, the polymer or blends thereof can be used in a wide variety of packaging applications for electronic devices, as well as for other uses in which static dissipative behavior is desirable. For instance, static cling problems are avoided when static dissipative polymer compositions are formed into films and/or fibers.

In addition, the static dissipative behavior of the polymer and its blends depends little on humidity. The polymer and its blends can therefore be used in dry climates as well as in high humidity conditions. An additional advantage is that the static dissipative additive does not significantly migrate out of the polymer, so the static dissipative character of the polymer or blend does not significantly decrease over time.

DETAILED DESCRIPTION OF THE INVENTION

The non-volatile, ionizable metal salt used as an antistatic agent in this invention is one containing at least one metal cation which is in ionic association with at least one anion. By ionizable, it is meant that the salt is one which provides mobile ions in the presence of an electric field. It is further desirable and preferable that the salt be one which is not readily extractable from the ketone-containing polymer or blends thereof by contact with water or other solvent.

The cation can be any metal which forms an ionizable salt with one or more anions, including those metals in Row 2, groups IA and IIA:, Row 3, groups IA, IIA and IIIA: Row 4, groups IA-IVA and IB-VIIIB: Rows 5 and 6, groups IA-VA and IB-VIIIB: and the lanthanide series of the Periodic Table of the Elements. Preferably, the metal is an alkali metal, an alkaline earth metal, Co, Ni, Fe, Cu, Cd, Zn, Sn, Al or Ag.

The anion is any which forms an ionizable salt with the metal cation. The anion is advantageously the conjugate base of an inorganic acid, a $C_2$-$C_4$ carboxylic acid or a tetraorganoboron ion. Suitable anions include, for example, the halides, i.e. F—, Cl—, Br—, and I—: $NO_3$—, $SCN$—, $SO_4^{2-}$, $HSO_4$—, $SO_3^{2-}$, $HSO_3$—, $ClO_4$—, $CO_3^{2-}$, $PO_4^{3-}$, $H_2PO_4$—, $HPO_4^{2-}$, $PO_3^{3-}$, $HPO_3^{2-}$, $H_2PO_3$—, fluoroalkyl sulfonic acid anions (optionally having hydrogen and/or other halogen atom substituents as well as fluorine atoms), perfluoroalkyl sulfonic acid anions, tetraorganoboron, particularly tetraalkyl and tetraphenylboron, and the like. Preferably, the anion is not an SCN- anion, since these salts tend to be water extractable, are less effective than other salts, and have a noticeable, undesirable odor and color. However, relatively low concentrations of SCN— salts, such as in mixtures of ionizable salts, are advantageous in the practice of the invention. The perfluoroalkyl sulfonic acid anions are suitably any perfluoroalkyl sulfonic acid anion compatible with the specific composition in which it is used, generally these perfluoroalkyl sulfonic acid salts have from about one to about twenty carbon atoms and are either straight chain, cyclic or branched in structure. The tetraorganoborons, perfluoroalkyl sulfonic acid salts, i.e. salts of $CF_3SO_3$—, $C_2F_5SO_3$ —, $C_2F_5SO_3$—, $C_3F_7SO_3$—, $C_6F_{13}SO_3$—, $C_8F_{17}SO_3$—, $C_{10}F_{21}SO_3$— and the like, are preferred on the basis of generally better performance and low corrosion potential. Most preferred are $CF_3SO_3$—, (triflate), other perfluoroalkyl sulfonic acid anions having from about one to about ten carbon atoms and tetraphenylboron ion, which are less reactive with metals, water or other materials which are often present in the polymer or come in contact with the polymer than are most other anions. The most preferred salts are an alkali metal tetraphenylboron and perfluoroalkyl sulfonic acid salts, especially sodium tetraphenylboron, sodium triflate, and sodium salts of the perfluoroalkyl sulfonic acids having from about 5 to about 9 carbon atoms. The perfluoroalkyl sulfonic acid salts are particularly preferred for applications in which the composition containing the salts is to be heated above about 230° C., especially when the compositions are to be heated above about 300° C., Compositions containing perfluoroalkyl sulfonic acid salts generally exhibit greater clarity and retain their static dissipative qualities after such heating better than do similar compositions containing other ionizable salts.

Other preferred salts include lithium nitrate, cobalt nitrate and the like.

The non-volatile, ionizable metal salt is dispersed in a polymer containing a plurality of carbonyl, that is ketone, groups in the polymer backbone, in an amount sufficient to render the polymer static dissipative. Blends of two or more carbonyl-containing polymers may also be used. For the purposes of this invention, a polymeric material is considered static dissipative if it is capable of dissipating 99% of a static charge of 5000 volts (direct current) within 30, preferably within about 10, more preferably within about 4, and most preferably within about 2 seconds, as measured according to Federal Test Standard 101C, Method 4046, omitting the water step as suggested in the Electronics Industry Association Interim Standard IS-5.

A suitable amount of the non-volatile, ionizable metal salt, which provides good static dissipative properties, is from about 0.003 to about 20 weight percent based on the weight of the carbonyl-containing polymer. Preferably, about 0.03 to about 3, and more preferably about 0.3 to about 2 weight percent of the non-volatile ionizable metal salt is used. In most instances, levels below those indicated in these ranges yield insufficient static dissipative behavior to the polymer, whereas higher levels do not provide significantly better static dissipative properties and are therefore unnecessary. It is noted that, to obtain a specified static dissipative property, the amount of salt needed varies inversely with the amount of carbonyl groups contained in the polymer. Accordingly, polymers containing high amounts of carbonyl groups require less salt to achieve a desired level of static dissipative behavior than do polymers having a lower amount of carbonyl groups.

The carbonyl-containing polymer also advantageously has a melt index, as measured according to ASTM D-1238, Condition E, of about 0.1 to about 500, preferably about 2 to about 150 grams/10 minutes. Melt indices within these ranges provide optimum processing characteristics.

When a blend of a carbonyl containing-polymer and another polymer is prepared, the blend advantageously contains about 0.003 to about 20, preferably about 0.03 to about 3 and more preferably about 0.3 to about 2 weight percent of the non-volatile, ionizable metal salt, based on the weight of the polymers in the blend. In preparing such blend, the order of mixing of the polymers and the salt is not critical, and they may be mixed in any desirable order. However, it is preferred to prepare a mixture of the salt in the carbonyl-containing polymer, which mixture contains a proportionally higher concentration of the salt, and then blend this mixture with the other polymer so that the blend contains an amount of the non-volatile, ionizable metal salt within the stated ranges.

The non-volatile, ionizable metal salt is dispersed in a polymer containing carbonyl (ketone) groups in the polymer backbone. Advantageously, the carbonyl groups constitute about 1 to about 45, preferably about 1 to about 30, weight percent of the polymer. When a polymer has from about 1 to about 45 weight percent carbonyl groups, it has a plurality of carbonyl groups. However, as mentioned before, the amount of carbonyl groups does effect the ability of the non-volatile, ionizable metal salt to provide static dissipative properties. Accordingly, for applications in which especially good static dissipative properties are desired, or when the carbonyl-containing polymer is to be blended with another polymer, it is particularly preferred that it contain about 10 to about 30 weight percent carbonyl groups. When perfluoroalkyl sulfonic acid salts are the ionizable salts, the polymer preferably has at least about 15 weight percent carbonyl groups, more preferably has from about 15 to 45 weight percent carbonyl groups, and most preferably has from about 15 to 30 weight percent carbonyl groups.

The structure of the carbonyl-containing polymer is not especially critical as long as it contains the required carbonyl groups in the polymer backbone. Such polymers are readily prepared, for example, by the oxidation of various polyolefins. However, the preferred carbonyl-containing polymer is an interpolymer of a lower olefin and carbon monoxide. The term "lower olefin" is used broadly herein to refer to a monounsaturated acyclic hydrocarbon having from about 2 to about 12, preferably 2-6, more preferably 2-4 carbon atoms, which are either unsubstituted or substituted with heteroatoms or groups which are inert, i.e., do not undesirably interfere with the interpolymerization of the lower olefin with carbon monoxide. Suitable inert substituent groups include halogen atoms, in particular chlorine, bromine and fluorine: phenyl groups: alkylate groups, such as acetate, propionate or isobutyrate: carbonyl groups, and the like. Exemplary lower olefins include ethylene, propylene, n-butylene, n-hexene, n-octene, vinyl chloride, vinylidene chloride, vinyl fluoride, vinylidene fluoride, trifluoroethylene, tetrafluoroethylene, vinyl acetate, vinyl propionate, methyl vinyl ketone and the like, as well as other monomers as described in Column 2 of U.S. Pat. No. 2,495,286, incorporated herein by reference. Mixtures of such lower olefins can of course be used. Preferably, the lower olefin comprises ethylene, propylene or n-butylene, or halogen-containing derivatives thereof, with ethylene (including small portions of a $C_3$-$C_8$ aliphatic olefin being optionally included for property modification) being especially preferred.

The carbonyl-containing polymer can be linear or branched, but in either case it is preferred that it be thermoplastic. The interpolymer may be a simple interpolymer of a lower olefin and carbon monoxide, or an interpolymer thereof with at least one other copolymerizable monomer, such as acrylic acid, methacrylic acid, ethyl acrylate, hydroxyethylacrylate and other acrylic esters. In addition, graft or block interpolymers having at least one segment of a lower olefin/carbon monoxide interpolymer are useful in this invention. Such interpolymers and other interpolymers which are equally useful in this invention, are described, for example, in U.S. Pat. Nos. 2,296,963, 2,436,269, 2,495,255, 2,495,286, 2,641,590, 3,083,184, 3,248,359, 3,530,109, 3,689,460, 3,694,412, 3,780,140, 3,835,123, 3,929,727, 3,948,850, 3,948,832, 3,968,082, 4,984,388, 4,024,104, 4,024,325, 4,024,326, 4,139,522, 4,143,096 and 4,304,887, all incorporated by reference.

In addition, partially hydrogenated carbon monoxide interpolymers containing hydroxyl groups may be used, such as hydrogenated ethylene-carbon monoxide interpolymers. Methods of hydrogenating ethylene-carbon monoxide interpolymers are described in U.S. Pat. No. 2,495,292.

Preferred carbon monoxide-containing interpolymers are random interpolymers of carbon monoxide and an unsubstituted or halogen-substituted lower olefin having 2-4 carbon atoms. The most preferred interpolymers are random interpolymers of ethylene and carbon monoxide containing about 1-25 weight percent carbonyl groups.

The preferred and most preferred interpolymers are conveniently prepared by a high pressure polymerization process in the presence of free-radical initiators or certain metallic catalysts. Such processes are described, for example in U.S. Pat. Nos. 2,495,292 and 3,984,388, incorporated herein by reference.

The non-volatile, ionizable metal salt can be incorporated into the carbonyl-containing polymer in any convenient manner. A particulate polymer can be mixed directly with the salt at the desired proportions and blended until the salt is dispersed into the polymer. Alternately, the salt can be blended into the melted polymer. In a preferred technique, a solution of the salt can be blended with the particulate or melted polymer, with the solvent later being removed as desired. This process provides especially good dispersion of the salt into the polymer. The solvent employed in this last process is any in which the salt is soluble and which is readily evaporated from the polymer/salt mixture. Suitable such solvents include water, acetone, methyl ethyl ketone, methyl isobutyl ketone, methanol, ethanol, butanol, dioxane and the like.

As stated before, the static dissipative polymer and blend of this invention are substantially devoid of a fatty acid salt, a $C_6$-$C_{30}$ carboxylic acid ester or a phosphate ester compound. By "substantially devoid" it is meant that the polymer or blend contains such materials in an amount less than an amount which significantly improves the static dissipative properties of the polymer or blend containing the ionizable metal salt. Preferably, the polymer or blend contains less than about 1 mole of such materials per mole of ionizable metal salt. More preferably, less than about 0.5 mole, most preferably less than 0.25 mole of fatty acid salt, $C_6$-$C_{30}$ carboxylic acid ester or phosphate ester compound are present per mole of ionizable metal salt. Generally, such fatty acid salts, carboxylic acid esters and phosphate compounds act as plasticizers and cause undesirable changes in the physical properties of such polymers as olefin polymers and copolymers. The polymers are softened, the plasticizers are often somewhat incompatible with the polymers and bleed from the polymers, causing a tackiness on the surface thereof.

The resulting static dissipative polymer can be processed, fabricated or otherwise manipulated and used in the same manner as similar carbonyl-containing polymers which do not contain the non-volatile, ionizable metal salt. The static dissipative polymer can be used, for example, to produce static dissipative items, including mono- or multilayered films, foams, fibers and molded parts, which are useful in protecting static-sensitive electronics during production, handling, packaging, storage and use. In making foams, a blowing agent such as low boiling hydrocarbons, fluorinated methanes and chemical blowing agents are incorporated into the polymer and caused to expand and form cells within the polymer. Other uses for the static dissipative polymers include dirt and dust-free packaging: packaging and molded articles for use in explosive environments: static dissipative fibers, such as for clean-room and hospital garments: photographic and X-ray applications, and other static control applications.

A particular advantage of the static dissipative polymer is that it is heat sealable and is also heatable and sealable using radio frequency or microwave radiation, as described in U. S. Pat. Nos. 4,600,614 and 4,601,948, incorporated herein by reference.

As with carbonyl-containing polymers generally, various additives can be blended into the static dissipative polymer to modify its properties as desired. Fillers such as kaolin, wollastinite, calcium carbonate, carbon black and the like are useful. Reinforcing fibers such as glass, polyester, polyamide or graphite fibers can be used to impart rigidity to the polymer. Pigments, antioxidants, stabilizers, dyes, blowing agents and the like may all be used with the static dissipative polymer of this invention. Particularly suitable antioxidants include tetrakis[methylene 3-{3',5'-di-t-butyl-4'-hydroxyphenyl}propionate) methane (commercially available under the trade name Irganox ® 1010 from Ciba-Geigy Corporation), tris{mixed mono- and dinonylphenyl} phosphite (commercially available under the trade name Naugard ® P, from Uniroyal, Inc.), tetrakis{2,4-di-t-butylphenyl}4,4'-biphenylene diphosphonite (commercially available under the trade name Sandostab ® PEPQ from Sandoz Corporation), and the like.

An important aspect of this invention is that the static dissipative interpolymer can itself be used as a static dissipative additive for other organic polymers. Such organic polymer can be of any type which can be blended with the carbonyl-containing polymer to form a blend having desirable properties. Suitable organic polymers for which the static dissipative polymer is useful as a static dissipative additive include, for example, polyethylene, polypropylene, polyisobutylene, ethylene-acrylic acid copolymers, polyesters, polyamides, polyvinylhalides, polystyrene, polycarbonates, thermoplastic polyurethanes, ethylene-vinyl acetate copolymers, ethylene-vinyl alcohol copolymers and the like. The organic polymer and the static dissipative polymer are blended at proportions to provide the blend with an amount of non-volatile, ionizable metal salt as stated before. In order for the blend to contain this quantity of salt, it is necessary that the static dissipative polymer contain a somewhat greater quantity of non-volatile, ionizable metal salt than described before. When the static dissipative polymer is used as a static dissipative additive, it advantageously contains from about 2-50, preferably about 5-25, weight percent of non-volatile, ionizable metal salt.

The organic polymer and static dissipative polymer can be blended using any suitable technique. Particulate organic polymers and static dissipative interpolymers can be mechanically blended, melt blended, or solutions of the salt can be blended with one or both the static dissipative interpolymer and the organic polymer, and the solvent subsequently stripped as desired. The static dissipative blend can be used in ways and for purposes similar to the static dissipative polymer, as well as for other applications for which the physical and other properties of the individual blends are adapted.

In addition, the polymer or blend or this invention may be used to form a multilayer composite in which the polymer or blend is present as a static dissipative layer. It also may be deposited on a substrate to form a static dissipative layer thereon.

The following examples are provided to illustrate the invention, but are not intended to limit the scope thereof. All parts and percentages are by weight unless otherwise indicated.

EXAMPLE 1

In this example, various static dissipative ECO (ethylene-carbon monoxide) interpolymers are prepared and their static dissipative properties tested and compared with a neat ECO interpolymer and a low density polyethylene. The ECO interpolymer used contains 11.5 wt.—% carbon monoxide and has a melt index of 6.7 g/10 min.

Static dissipative interpolymer Sample Nos. 1-5 are prepared by mixing one pound of a pelletized ECO interpolymer with a 46.15% weight percent aqueous solution of sodium tetraphenylboron. The amount of the tetraphenylboron solution is chosen so that the resulting interpolymer contains an amount of the salt as indicated in Table 1 following. The interpolymer and salt solution are vigorously shaken together in a plastic bag for about 3-4 minutes, and then extruded to melt the interpolymer and evaporate the water. Extrusion is done on an MPM one-inch single screw extruder having three heated zones and a length to diameter ratio of 20:1. The temperatures across the extruder range from 300-350° F., with the feed zone being coolest. Feed rates are about 4-5 pounds/hour, and the die pressure is less than 1000 psi. Residence time is less than two minutes. The extruded static dissipative interpolymer samples and comparative samples are formed into films of about 5 mil thickness utilizing a hydraulic press at about 350° F and 35,000 psig pressure. The resulting films are cut into 3.5" by 5.5" rectangles for static decay testing on an ElectroTech 406C Static Decay Meter. Testing is done according to Federal Test Standard 101C, Method 4046, omitting the water step as suggested in the Electronics Industry Association Interim Standard IS-5. The samples and comparative samples are aged about 24 hours at 9-15% relative humidity prior to testing. The results of this testing are reported in Table 1 following.

For comparison, the static decay time for the ECO interpolymer without any salt is determined. In addition, the static decay properties of a low density polyethylene, both with and without the salt, are determined. The results are reported in Table 1.

TABLE 1

| Sample No. | Polymer | Wt. % Na(Ph)$_4$B salt | Decay Time, sec. |
|---|---|---|---|
| A* | LDPE | 0 | NM** |
| B* | LDPE | 1.0 | NM** |
| C* | ECO | 0 | NM** |
| 1 | ECO | 0.1 | 16.9 |
| 2 | ECO | 0.3 | 4.15 |
| 3 | ECO | 0.5 | 2.13 |
| 4 | ECO | 1.0 | 0.56 |
| 5 | ECO | 2.0 | 0.12 |

*Not an example of this invention.
**Not meaningful - the samples have an inherent charge of >1000 volts which cannot be discharged.

The data in Table 1 demonstrate the excellent static dissipative properties achieved using very small amount of non-volatile, ionizable metal salt. In addition, the polyethylene examples show the criticality of using a carbonyl-containing polymer, as the addition of the salt does not render the polyethylene static dissipative.

EXAMPLE 2

In this example, a static dissipative ECO interpolymer containing sodium thiocyanate as the antistatic agent (Sample No. 6) is prepared and tested as described in Example 1, except static decay time is measured as the time required to dissipate 90% of a 5000 VDC charge. The ECO interpolymer contains 15 wt.— carbon monoxide and has a melt index of 7.8 g/10 min. Sample No. 6 is prepared with 0.075 wt.—% sodium thiocyanate and exhibits a static decay time of 2.26 seconds. Although useful, the sodium thiocyanate is shown to be less effective than other salts in imparting static dissipative behavior to the polymer.

EXAMPLE 3

In this example, sodium tetraphenylboron is blended with an ECO interpolymer containing 30 wt.—% carbon monoxide and having a melt index of 150 g/10 min. to form a static dissipative polymer.

A quantity of the ECO interpolymer is melted in a Farrell two-roll mill with the front roll being kept 45-50 psi steam pressure and the back roll being chilled with water. The temperature of the molten interpolymer is about 300° F. A 5 wt.—% aqueous solution of sodium tetraphenylboron is added slowly to the molten interpolymer to yield a final salt concentration of 300 parts per million (ppm). The resulting static dissipative polymer is designated Sample No. 7. Sample No. 8 is prepared in like manner, except sufficient of the tetraphenylboron solution is added to provide a final salt concentration of 750 ppm. Both Samples are pressed into films of 4.5-5.0 mil thickness and tested for static dissipation as described in Example 1. Sample No. 7 dissipates an applied static charge of 5000 VDC in 0.94 second. Sample No. 8 dissipates a like charge in 0.47 second. Comparison of these results with those of Sample Nos. 1-5 show that as the carbon monoxide content of the ECO interpolymer increases, less of the salt is required to provide equivalent static dissipative behavior.

EXAMPLE 4

To 55 parts by weight of methyl ethyl ketone are added 45 parts of sodium tetraphenylboron at room temperature. A clear solution is obtained. This solution is blended with an ECO interpolymer containing 10 weight-% carbon monoxide and having a melt index of 10 g/10 min. The blending is done on a Werner-Pfleiderer ZSK-53 co-rotating twin-screw extruder compounder having four mixing zones which are maintained at 180° C. The salt solution and the ECO interpolymer are injected into the first zone of the extruder. The solvent is removed by pulling a vacuum at zones 3 and 4. The proportion of salt solution and polymer are varied to provide static dissipative polymers (Sample Nos. 9-14) having a salt content as described in Table 2. The resulting static dissipative polymers are extruded and pelletized. Films are prepared from each of Sample Nos. 9-14 using a Killion ¾" single screw blown film assembly, using a temperature of 350-375° F. These films are tested for static dissipative behavior, with results as indicated in Table 2 following.

TABLE 2

| Sample No. | Wt. % Na(Ph)$_4$B salt | Film Thickness, mil | Static Decay Time, sec. |
|---|---|---|---|
| 9 | 0.74 | 4 | 1.00 |
| 10 | 0.74 | 2 | 2.09 |
| 11 | 0.97 | 4 | 0.54 |
| 12 | 1.64 | 4 | 0.35 |
| 13 | 3.27 | 4 | 0.30 |
| 14 | 3.27 | 2 | 0.68 |

As can be seen from the data in Table 2, very good static dissipative properties are provided at relatively low levels of salt. The method of using a solvent to incorporate the salt into the polymer is found to be very effective.

EXAMPLE 5

In this example a static dissipative ECO interpolymer containing 5.0% by weight sodium tetraphenylboron is blended with other polymers to render them static dissipative. The static dissipative ECO interpolymer is prepared according to the general procedure described in Example 4, and pelletized. Two techniques are used to blend the static dissipative ECO interpolymer with the other polymers. In the dry blending technique, the pelletized static dissipative ECO interpolymer and pellets of the other polymer are tumble blended and blown into film using a Gloucester blown film instrument equipped with a 2½" extruder and a 6" die. The Gloucester is operated at a temperature of 375° F. and a rate of 75-125 pounds/hour.

In the melt blending technique, pellets of the static dissipative ECO interpolymer and the other polymer are blended and extruded on a 2½" NRM compounding extruder operated at a temperature of 350-375° F. The resulting extrudate is then blown into a film using a Gloucester blown film instrument operated as described before.

The resulting blends are evaluated for static dissipative properties as described in Example 1. In addition, the concentration of sodium tetraphenylboron in the blend is determined by emission spectroscopy. The type of other polymer, the blending method, the film thickness, the salt concentration, and the static decay time are as indicated in Table 3.

TABLE 3

| Sample No. | Other Polymer[1] | Blending Method[2] | Conc. Na(Ph)$_4$B Wt. % | Film Thickness, mil | Static Decay Time, sec. |
|---|---|---|---|---|---|
| 15 | EEA | DB | 1.42 | 4.0 | 1.87 |
| 16 | EEA | MB | 1.42 | 4.3 | 2.58 |
| 17 | LDPE | DB | 0.97 | 4.0 | 5.02 |
| 18 | LDPE | MB | 0.97 | 3.7 | 21.6 |

[1]EEA is a 85% ethylene/15% ethyl acrylate copolymer having a melt index of 1.5 g/10 min. LDPE is a low density polyethylene having a melt index of 2 g/10 min.
[2]MB is melt blending. DB is dry blending.

As can be seen from the data in Table 3, the static dissipative ECO interpolymer is useful in rendering other polymers static dissipative.

EXAMPLE 6

In this example, sodium tetraphenylboron is dry blended with pelletized ECO interpolymers of varying melt index, according to the dry blending process described in Example 5. All ECO interpolymers contain 10% carbon monoxide. Following the dry mixing, the mixture is extruded using an MPM one-inch extruder, under the conditions described in Example 1. All mixtures are passed through the extruder twice to ensure homogeneity. The melt indices of the ECO interpolymers and the concentration of salt in each sample are reported in Table 4. All samples are pressed into 5 mil films and tested for static dissipative properties as described in Example 1. These results are reported in Table 4.

TABLE 4

| Sample No. | Melt Index,[1] g/10 min | Salt Conc., wt. % | Decay time, sec. |
|---|---|---|---|
| C* | 1.5 | 0 | NM** |
| 19 | 1.5 | 1.0 | 4.1 |
| 20 | 1.5 | 1.5 | 1.3 |
| 21 | 10 | 1.0 | 1.8 |
| 22 | 10 | 1.5 | 0.3 |

*Not an example of this invention.
**Not meaningful - the samples show an inherent charge of >1000 volts which cannot be discharged completely or at all.
[1]ASTM D-1238 Condition E.

The data in Table 4 show that with increasing melt index, better static dissipative properties are achieved at a given level of non-volatile, ionizable metal salt.

EXAMPLE 7

Using a melt blending technique as described in Example 5, blends of a static dissipative ECO interpolymer and other polymers are prepared. The static dissipative ECO interpolymer is a 10 g/10 min. melt index polymer containing 10 wt.−% carbon monoxide and a variable amount of sodium tetraphenylboron. The blends are injection molded to form 3/16" plaques. The plaques are then tested for static dissipative properties. The compositions of the blends in terms of the types and proportions of the component polymers, and the amount of salt in the blend, are reported in Table 5 following.

TABLE 5

| Sample No. | % ECO Inter-polymer | Other Polymer Type[1] | Wt. % | Wt. % Na(Ph)4B | Static Decay Time, Sec. |
|---|---|---|---|---|---|
| 23 | 40 | HDPE | 60 | 0.5 | 0.56 |
| 24 | 50 | HDPE | 50 | 0.5 | 0.17 |
| 25 | 34 | PP | 66 | 0.3 | 0.48 |
| 26 | 66 | PP | 34 | 1.0 | 0.05 |
| 27 | 100 | None | 0 | 0.5 | 0.12 |

[1]HDPE is a high density polyethylene with a melt index of 10 g/10 min. PP is polypropylene with a melt index of 5 g/10 min.

The antistatic ECO interpolymer is found to be very effective as a static dissipative additive for various thermoplastics.

EXAMPLE 8

This example illustrates the effect of carbon monoxide content on the effectiveness of the ionizable salt.

Using 1.5 melt index ECO interpolymers having carbon monoxide contents of 10, 15, and 20 wt.−%, static dissipative polymers are prepared with sodium tetraphenylboron according to the general procedure described in Example 1. It is found that at 10% carbon monoxide, 1.8 wt.−% of the salt is required to achieve a static decay time of 2 seconds. For the 15% CO polymer, about 0.5 wt.−% of the salt is required to obtain a decay time of 2 seconds, and only about 0.3 wt.−% is required with the 20 wt.−% CO polymer.

Using the 10 wt.−% CO interpolymer having a melt index of 10 g/10 min., 1 wt.−% of the salt is required to obtain a decay time of 0.3 second, compared to only 0.35 wt.-% with a 15 wt.−% CO, 10 melt index interpolymer.

These data establish that the non-volatile ionizable metal salt is more effective in higher melt index interpolymers, at an equivalent quantity and that the higher CO-containing interpolymers are more effective at a given level of salt.

EXAMPLE 9

In this example, the static dissipation of ECO interpolymers containing sodium triflate as the antistatic agent and having different relative proportions of carbonyl groups are compared with the static dissipation of a sample of ECO alone.

Samples of ECO having the relative proportion of carbonyl groups, melt indexes and amounts of sodium triflate listed in Table 6 are prepared by the dry blending technique of Example 1. The sample having no triflate salt and the sample having a 10% by weight carbonyl groups are passed through the MPM one inch single screw extruder described in Example 1 three times at 325° F. The sample having 27% by weight carbonyl groups is passed through twice at 300° F.

The samples are then blown into films having thicknesses of about 6 mils by using the 3/4" Killion as in Example 4. The film having sodium triflate and 10% carbonyl groups is cloudier than the film having no triflate The film having sodium triflate and 27% carbonyl groups, however, shows no visible salt particles. Being produced from 50 melt index polymer, the film tears easily, but is a suitable configuration for measurement of static dissipation.

The film is conditioned for 15 minutes at room temperature and 15%, relative humidity. Samples measuring 3.5 in by 5.5 inches are cut for testing. Static dissipation of each sample is measured as in Example 1, and the results of three such measurements on each sample are shown in Table 6.

TABLE 6

| Sample Number | Carbonyl Groups wt. % | Melt Index, g/10 min. | Film Thickness, Mils. | Na Triflate, wt. % | STPB*, wt. % | Decay Time, Sec., +5000 V | | | Decay Time, Sec., −5000 V | | |
|---|---|---|---|---|---|---|---|---|---|---|---|
| 20 | 10 | 10 | 4 | 0 | 1 | 0.81 | 0.81 | 0.82 | 0.75 | 0.76 | 0.77 |
| 30 | 10 | 10 | 3 | 1 | 1 | 0.98 | 0.99 | 1.00 | 0.91 | 0.90 | 0.93 |
| 31 | 27 | 50 | 10 | 1 | 0 | 0.04 | 0.04 | 0.04 | 0.05 | 0.03 | 0.03 |

*STPB is sodium tetraphenyl boron.

After the films are stored for nine days at 12% relative humidity and room temperature, the decay times are again measured according to the procedures of Example 1. The results are given in Table 7.

TABLE 7

| Sample Number | Carbonyl Content wt. % | Melt Index, g/10 min. | Film Thickness, Mils. | Na. Triflate, wt. % | STPB*, wt. % | Decay Time, Sec., +5000 V | | | Decay Time, Sec., −5000 V | | |
| --- | --- | --- | --- | --- | --- | --- | --- | --- | --- | --- | --- |
| 29 | 10 | 10 | 4 | 0 | 1 | 0.84 | 0.85 | 0.83 | 0.76 | 0.77 | 0.77 |
| 30 | 10 | 10 | 3 | 1 | 1 | 1.01 | 1.02 | 1.01 | 0.94 | 0.94 | 0.95 |
| 31 | 27 | 50 | 10 | 1 | 0 | 0.03 | 0.03 | 0.03 | 0.03 | 0.03 | 0.03 |

*STPB is sodium tetraphenyl boron.

A comparison of the static decay times of Samples 29 and 30 in Tables 6 and 7 show that sodium triflate is more effective in improving static dissipation of ECO polymers having 27 weight percent carbon monoxide than it is when used with sodium tetraphenylboron in ECO polymers having 10 percent carbon monoxide. Comparison of the static decay times is complicated by the differences in film thickness and melt index noted in Table 7.

EXAMPLE 10

One Kilogram samples having the carbonyl contents, amounts of sodium triflate, sodium tetraphenyl boron and properties shown in Table 8 are prepared from ECO having melt indexes as indicated in Table 8. Samples are melted, blended and extruded at the indicated temperatures. With the exception of Sample H which is blown at 350° F, the films are formed at the temperatures indicated in Table 8 using a one inch Wayne extruder and a cast film die head. The films are extruded onto a chilled metal roller where they cool before being wound onto a roll. The extruded films have a thickness of 5 mils. After a conditioning period of 24 hours at 12% relative humidity and room temperature, the static decay times for each 3.5 in. by 5.5 in. sample are measured by the procedure of Example 1 and are given in Table 8.

TABLE 8

| Sample Number | Carbonyl Groups wt. % | Melt Index, g/10 min. | Temp. °F. extrusion T/ film T | Na. Triflate, wt. % | STPB*, wt. % | Decay Time, Sec., +5000 V | | | Decay Time, Sec., −5000 V | | |
| --- | --- | --- | --- | --- | --- | --- | --- | --- | --- | --- | --- |
| 32 | 15 | 21 | 350/350 | 1 | 0 | 0.15 | 0.18 | 0.18 | 0.13 | 0.13 | 0.14 |
| 33 | 20 | 33 | 350/350 | 1 | 0 | 0.05 | 0.05 | 0.05 | 0.05 | 0.05 | 0.06 |
| 34 | 10 | 10 | 400/350 | 0 | 1 | 0.60 | 0.61 | 0.63 | 0.54 | 0.54 | 0.53 |
| 35 | 10 | 10 | 400/350 | 1 | 1 | 0.43 | 0.44 | 0.45 | 0.42 | 0.42 | 0.42 |
| 36 | 10 | 10 | 450/350 | 0 | 1 | 0.58 | 0.58 | 0.58 | 0.53 | 0.54 | 0.52 |
| 37** | 10 | 10 | 450/350 | 0 | 1 | 2.38 | 2.40 | 2.57 | 1.70 | 1.76 | 1.81 |
| 38 | 10 | 10 | 450/350 | 1 | 1 | 0.47 | 0.46 | 0.48 | 0.43 | 0.45 | 0.43 |

*STPB is sodium tetraphenyl boron.
**a film blown by the process of Example 4.

Static dissipation measurements for Samples 32, and 33 show that use of 1 percent by weight sodium triflate salt in a polymer having 15 weight percent carbonyl groups significantly improves its static dissipative properties, and that use of the same amount of the salt in a similar polymer having 20 weight percent carbonyl groups is even more effective. The static dissipative data for Samples 35 and 38 indicates that static dissipative properties are very nearly the same for the polymers whether or not they are heated to 450° F. (230° C).

EXAMPLE 11

In this example, a mixture of perfluorosulfonic acid salts is used as the antistatic agent in an ECO-containing film.

At room temperature, a solution of 35 weight percent of a mixture of isomers of potassium salts of perfluoroalkylsulfonic acids commercially available from 3M Corp. under the trade designation Fluorad ® FC-98* (Chemical Abstracts registry number 12751-11-0) in a 90 weight percent mixture of methyl ethyl ketone and 10 weight percent water is formed. The solution is filtered through a paper filter for clarification. A concentrate of this solution, corresponding to 3.93 parts by weight Fluorad ® FC-98, with 96.07 parts of an ECO interpolymer containing 17 weight percent carbon monoxide is formed. Blending is done on the Werner-Pfleiderer ZSK-53 compounder used in Example 4 using a metered solution injection of the methyl ethyl ketone solution. Methyl ethyl ketone is removed as in Example 4. The resulting concentrate is extruded and pelletized as in Example 4. *Potassium emission spectroscopy shows Fluorad ® FC-98 to have an average atomic composition of $C_6F_{13}SO_3K$. The carbon to fluorine ratio is calculated to account for the difference in weight between the sample and potassium detected while having integer subscripts for all atoms represented in the formula.

A blend of 30 parts of the concentrate containing 3.93 weight percent of the Fluorad ® FC-98 salt and 70 parts of ECO interpolymer containing 17 weight percent carbon monoxide is formed by extrusion, compounded and pelletized using the MPM one-inch single screw extruder as in Example 1.

The pelletized blend of static dissipative polymer is blown into a 6 mil film using a Killion ¾" single screw blown film assembly as in Example 4. The film is conditioned for 24 hours at room temperature at 12 percent relative humidity. A 3.5 inch ×5.5 inch sample of the film is tested for static dissipation time by the procedure of Example 1. The static dissipation time is 6.5 seconds.

EXAMPLE 12

A concentrate having 5.17 weight percent of Fluorad ® FC-98 in ECO having a carbon dioxide content of 17 weight percent is formed as in Example 10. Thirty parts of the concentrate is blended with 70 parts of the ECO having 17 weight percent carbon dioxide as in Example 10 to form a blend having 1.71 weight percent of Fluorad ® FC-98 salts in the ECO polymer. A film is formed as in Example 10 and found to have a static dissipation time of 6.5 seconds after conditioning as in Example 10.

Examples 11 and 12 show that Fluorad ® FC-98 is effective as a static dissipating additive which can be added to a polymer using liquid injection of a solution of the salt. The examples also illustrate the use of a concentrate of the static dissipative additive in a polymer and subsequent addition of the concentrate to an ECO polymer to form a blend having a lower concentration of the additive than had the concentrate.

EXAMPLE 13

In this example, a solution of sodium triflate is blended with and ECO polymer to form a concentrate which is subsequently blended with other polymers and molded or blown into films having static dissipative properties.

A solution of 35 weight percent sodium triflate is formed in methyl ethyl ketone at room temperature. A concentrate, corresponding to 3.5 parts by weight of sodium triflate and 96.5 parts by weight of ECO polymer containing 16 weight percent carbon monoxide is formed, extruded and pelletized by the procedure of Example 11.

Samples of the concentrate are blended with other polymers indicated in Table 9 using the dry blending technique of Example 5. Resulting blends are injection molded into plaques having a thickness of 75 mils and are blown into films having a thickness of 3 mils using a Killion blown film assembly as in Example 4. The Static decay times for each sample are measured as in Example 1 and are given in Table 9.

TABLE 9

| Sample No. | Other Polymer | Blend Melt Index g/10 min. | Blend CO Content (Wt. %) | Conc. Na triflate (Wt. %) | Average Static Decay (sec.) | |
|---|---|---|---|---|---|---|
| | | | | | film | plaque |
| 39 | ECO | 10 | 16 | 0.35 | 5.5 | 0.45 |
| 40 | ECO | 10 | 16 | 0.7 | 3.0 | 0.20 |
| 41 | ECO | 10 | 16 | 1.05 | 2.0 | 0.17 |
| 42 | ECO | 10 | 11.8 | 1.05 | 4.0 | 1.9 |
| 43 | LDPE[1] | <5 | 4.8 | 1.05 | 1.4[3] | 3.7 |
| 44 | EAA[2] | <5 | 4.8 | 1.05 | 2.34[3] | 1.0[3] |

[1]LDPE is low density polyethylene having a density of 0.922 and a melt index of 2.0. These parts of the ECO/triflate concentrate is mixed with 7 parts LDPE.
[2]EAA is a medium acid ethylene acrylic acid polymer having 9.75 weight percent acrylic acid, a melt index of 1.5 and a density of 0.939. Commercially available from The Dow Chemical Company under the trade designation Primacor ® 1410. These parts of the ECO/triflate concentrate is mixed with 7 parts of Primacor resin.
[3]Time required to dissipate 90% of 5000 volt D.C. charge measured. All other measurements are for dissipation of 99% of a 5000 V charge.

The data in Table 9 show that sodium triflate is an efficient static decay additive which can be added to a polymer using liquid injection of a solution of the salt. The data also show that a concentrate of the salt in an ECO polymer can be used to add effective amounts of the salt to other polymers. A comparison of the static decay times of Samples 41 and 42 shows that while sodium triflate is an effective antistatic additive in compositions having 11.8 or 16 weight percent carbonyl groups, it is more effective with a higher concentration of carbonyl groups. The data also shows that the relatively thicker plaques are rendered more static dissipative, as measured by the procedure described in Example 1, than are the relatively thinner films.

What is claimed is:

1. A polymer having a plurality of ketone groups in the polymer backbone, or a blend of such polymers, which polymer or blend contains dispersed therein an amount of a non-volatile, ionizable metal salt sufficient to render the polymer static dissipative, which polymer or blend is substantially devoid of a fatty acid salt, a $C_6$–$C_{30}$ carboxylic acid ester and a phosphate ester compound.

2. The polymer of claim 1 which contains about 1 to about 45 weight percent ketone groups.

3. The polymer of claim 2 wherein the ionizable metal salt is an alkali metal tetraphenylboron or perfluoroalkyl sulfonic acid salt.

4. The polymer of claim 3 wherein the ionizable metal salt is an ionizable alkali metal salt of a perfluoroalkyl sulfonic acid.

5. The polymer of claim 4 wherein the ionizable metal salt is selected from the group consisting of an alkali metal salt of a perfluoroalkyl sulfonic acid having from about 1 to about 20 carbon atoms and mixtures thereof.

6. The polymer of claim 5 wherein the ionizable metal salt is an alkali metal $CF_3SO_3$—salt.

7. The polymer of claim 5 which is an interpolymer of carbon monoxide and a lower olefin.

8. The polymer of claim 3 which is an interpolymer of carbon monoxide and a lower olefin.

9. The polymer of claim 8 which contains about 0.03 to about 3 wt.—% of the ionizable metal salt.

10. The polymer of claim 9 which dissipates 99% of an applied static charge of 5000 volts direct current within about 20 seconds.

11. The polymer of claim 10 wherein the ionizable metal salt is sodium tetraphenylboron.

12. The polymer of claim 10 wherein the ionizable metal salt is selected from the group consisting of an alkali metal salt of a perfluoroalkyl sulfonic acid having from about 5 to about 9 carbon atoms or mixtures thereof.

13. The polymer of claim 8 wherein the polymer is an interpolymer of carbon monoxide, a lower olefin and at least one other copolymerizable monomer.

14. A static dissipative polymer blend comprising a physical admixture of
    (a) a first polymer which is not a ketone-containing polymer,
    (b) a polymer having a plurality of ketone groups in the polymer backbone, and
    (c) a non-volatile, ionizable metal salt,
wherein said non-volatile, ionizable metal salt is present in an amount sufficient to render the blend static dissipative, and which blend is substantially devoid of a fatty acid salt, a $C_6$–$C_{30}$ carboxylic acid ester and a phosphate ester compound.

15. The blend of claim 14 wherein component (b) contains about 1 to about 45 weight percent ketone groups.

16. The blend of claim 15 wherein the ionizable metal salt is an alkali metal tetraphenylboron or perfluoroalkyl sulfonic acid salt.

17. The blend of claim 16 wherein component (b) is an interpolymer of carbon monoxide and a lower olefin.

18. The blend of claim 17 which contains about 0.03 to about 3 wt.—% of the ionizable metal salt.

19. The blend of claim 18 which dissipates 99% of an applied static charge of 5000 volts direct current within about 20 seconds.

20. The blend of claim 19 wherein the ionizable metal salt is sodium tetraphenylboron.

21. The blend of claim 19 wherein the ionizable metal salt is at least one alkali metal salt of a perfluoroalkyl sulfonic acid having from about 1 to about 20 carbon atoms.

22. The polymer of claim 3 which is prepared by blending the ethylene carbon monoxide interpolymer with a solution of the ionizable metal salt in a volatile solvent, and then stripping the solvent.

23. The polymer of claim 22 which is prepared by dry blending the ethylene carbon monoxide interpolymer with the ionizable metal salt in the absence of a volatile solvent.

24. A mono- or multilayered film prepared from the polymer of claim 1.

25. A molded article prepared from the polymer of claim 1.

26. A mono- or multilayered film prepared from the blend of claim 14.

27. A molded article prepared from the blend of claim 14.

28. A substrate coated with the polymer of claim 1.

29. A substrate coated with the blend of claim 14.

30. A foam prepared from the polymer of claim 1.

31. A foam prepared from the blend of claim 14.

32. The polymer of claim 1 wherein the non-volatile, ionizable metal salt is a salt containing an anion which is not SCN-, and the ketone-containing polymer has a melt index from about 0.1 to about 500 grams/10 minutes, as measured according to ASTM D-1238, condition E.

33. The polymer of claim 1 wherein the non-volatile, ionizable metal salt is a mixture containing at least one salt containing an anion which is SCN- and at least one salt containing an anion which is not SCN-, and the ketone-containing polymer has a melt index from about 0.1 to about 500 grams/10 minutes, as measured according to ASTM D-1238, condition E.

34. The blend of claim 14 wherein the non-volatile ionizable metal salt is a salt containing an anion which is not SCN-, and the ketone-containing polymer has a melt index from about 0.1 to about 500 grams/10 minutes, as measured according to ASTM D-1238, condition E.

35. The blend of claim 14 wherein the non-volatile ionizable metal salt is a mixture containing at least one salt containing an anion which is SCN- and at least one salt containing an anion which is not SCN-, and the ketone-containing polymer has a melt index from about 0.1 to about 500 grams/10 minutes, as measured according to ASTM D-1238, condition E.

36. A process for preparing a static dissipative ketone-containing polymer, comprising dispersing into a ketone-containing polymer an effective amount of a non-volatile ionizable metal salt, wherein said polymer is substantially devoid of a fatty acid salt, a $C_6$-$C_{30}$ carboxylic acid ester and a phosphate ester compound.

37. The process of claim 36 wherein said non-volatile, ionizable metal salt contains an anion which is not SCN-.

38. A process for preparing a static dissipative polymer blend, comprising blending a first polymer which is not a ketone-containing polymer, a ketone-containing polymer, and an effective amount of a non-volatile ionizable metal salt, wherein said blend is substantially devoid of a fatty acid salt, a $C_6$-$C_{30}$ carboxylic acid ester and a phosphate ester compound.

39. The process of claim 38 wherein said non-volatile, ionizable metal salt contains an anion which is not SCN-.

* * * * *